United States Patent
Kaneko

(10) Patent No.: US 11,662,535 B2
(45) Date of Patent: May 30, 2023

(54) PRINTING APPARATUS

(71) Applicant: Seiko Epson Corporation, Tokyo (JP)

(72) Inventor: Kenichiro Kaneko, Okaya (JP)

(73) Assignee: SEIKO EPSON CORPORATION

( * ) Notice: Subject to any disclaimer, the term of this patent is extended or adjusted under 35 U.S.C. 154(b) by 343 days.

(21) Appl. No.: 16/893,566

(22) Filed: Jun. 5, 2020

(65) Prior Publication Data
US 2020/0386963 A1  Dec. 10, 2020

(30) Foreign Application Priority Data
Jun. 7, 2019  (JP) .............. JP2019-106837

(51) Int. Cl.
| B41J 2/17 | (2006.01) |
| B41F 17/08 | (2006.01) |
| G02B 6/44 | (2006.01) |
| B41J 2/175 | (2006.01) |

(52) U.S. Cl.
CPC ............ *G02B 6/4415* (2013.01); *B41F 17/08* (2013.01); *B41J 2/175* (2013.01)

(58) Field of Classification Search
CPC ......... B41J 2/175; G02B 6/4415; B41F 17/08
See application file for complete search history.

(56) References Cited

U.S. PATENT DOCUMENTS

| 6,609,792 | B2 | 8/2003 | Kaga et al. | |
| 9,975,330 | B1* | 5/2018 | Metcalfe | .............. B41J 2/04596 |
| 2002/0080218 | A1 | 6/2002 | Kaga et al. | |
| 2019/0154942 | A1* | 5/2019 | Sakurai | .................. H05K 1/189 |

FOREIGN PATENT DOCUMENTS

| JP | 2002-254755 A | 9/2002 |
| JP | 2006-010792 A | 1/2006 |
| JP | 2014-151476 A | 8/2014 |
| JP | 2019-013388 A | 1/2019 |

* cited by examiner

*Primary Examiner* — Jason S Uhlenhake
(74) *Attorney, Agent, or Firm* — Harness, Dickey & Pierce, P.L.C.

(57) ABSTRACT

A printing apparatus includes a first substrate provided with a first connector, a second substrate provided with a second connector, and an optical cable that couples the first connector with the second connector and transmits an optical signal. The optical cable is arranged movable in a curved shape in a storage space between the first substrate and the second substrate.

7 Claims, 11 Drawing Sheets

PRINTING APPARATUS

The present application is based on, and claims priority from JP Application Serial Number 2019-106837, filed Jun. 7, 2019, the disclosure of which is hereby incorporated by reference herein in its entirety.

BACKGROUND

1. Technical Field

The present disclosure relates to a printing apparatus.

2. Related Art

A technique that uses an optical cable to transmit various signals in a printing apparatus has been known. For example, JP-A-2014-151476 describes a technique that couples between two connectors with an optical cable in a printing apparatus.

In the technique described above, the optical cable may be required to be removed from the connector such as when replacing a substrate where the connector to which the optical cable is coupled. However, when removing the optical cable from the connector in a small space in the printing apparatus, the optical cable may collide with a component in the printing apparatus and the optical cable may be damaged in reaction to the removal of the optical cable from the connector.

SUMMARY

A printing apparatus according to the present disclosure includes a first substrate provided with a first connector, a second substrate provided with a second connector, a storage body that stores the first substrate, and an optical cable that couples the first connector with the second connector and transmits an optical signal. The storage body is provided with a storage space where the optical cable is arranged movable in a curved shape.

DESCRIPTION OF EXEMPLARY EMBODIMENTS

Hereinafter, embodiments for carrying out the disclosure will be described with reference to the drawings. However, in each drawing, the dimension and scale of each portion are appropriately differentiated from the actual ones. The embodiments described below are preferred specific examples of the present disclosure, so that technically preferred various limitations are made. However, the scope of the present disclosure is not limited to the embodiments as long as there is no statement that limits the present disclosure in the description below.

1. EMBODIMENT

In the present embodiment, a printing apparatus is described by illustrating an ink jet printer that discharges ink and forms an image on a recording medium PP. In the present embodiment, the ink is an example of "liquid" and the recording medium PP is an example of "medium".

1.1. Overview of Ink Jet Printer

Hereinafter, an overview of the ink jet printer 1 according to the present embodiment will be described with reference to FIG. 1.

Figure 1:
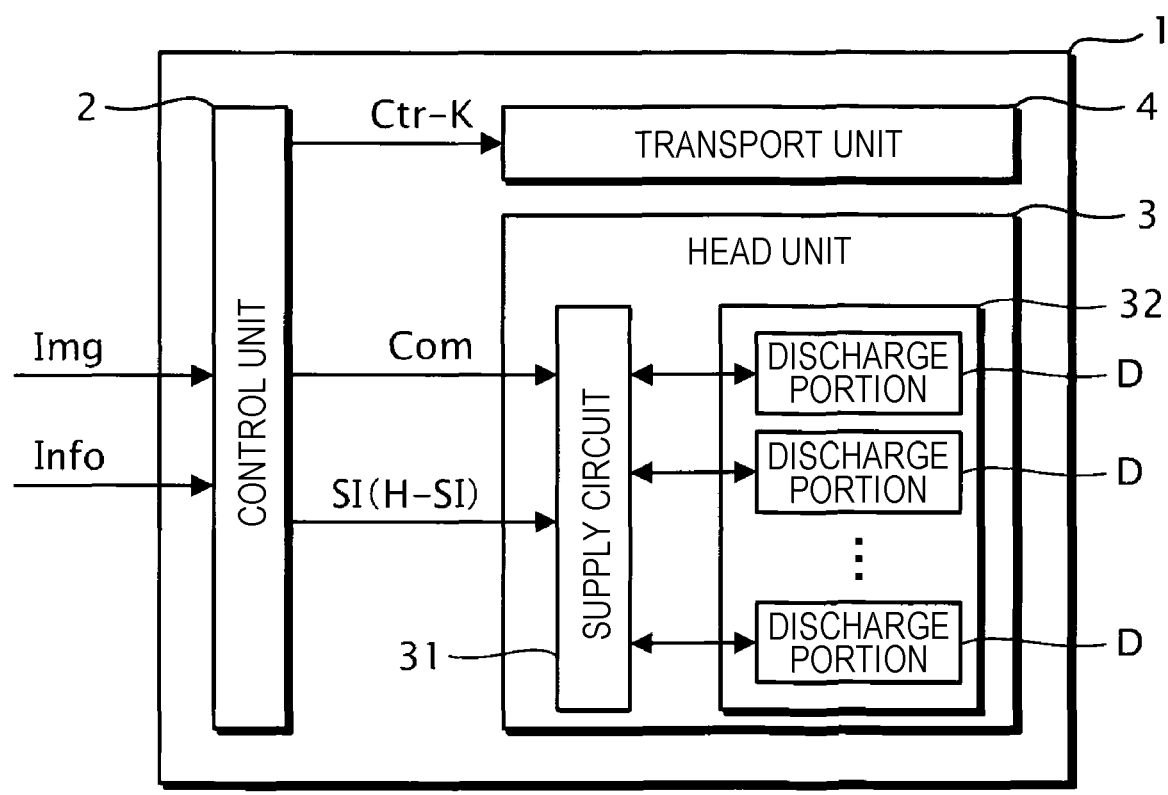
FIG. 1 is a block diagram showing an example of a configuration of an ink jet printer according to an embodiment of the present disclosure.

FIG. 1 is a functional block diagram showing an example of a configuration of the ink jet printer 1.

As shown in FIG. 1, the ink jet printer 1 is supplied with print data Img representing an image to be formed by the ink jet printer 1 from a personal computer or a host computer of a digital camera or the like. The ink jet printer 1 performs print processing that forms an image represented by the print data Img supplied from the host computer on the recording medium PP.

As shown in FIG. 1, the ink jet printer 1 is supplied with print setting information Info from the host computer. In the present embodiment, as an example, a case is assumed where the print setting information Info includes print mode information Mod specifying a print mode when the ink jet printer 1 performs the print processing and information BJ representing the number of images to be formed by the ink jet printer 1.

In the following description, a series of processing from when the ink jet printer 1 receives the print data Img and the print setting information Info to when the ink jet printer 1 performs print processing and forms images represented by the print data Img, the number of which is represented by the information BJ of the number of images, may be referred to a print job.

In the present embodiment, as an example, a case is assumed where the ink jet printer 1 can perform print processing by three types of print modes, including a normal print mode, a speed priority print mode, an image quality priority print mode. Here, the speed priority print mode is a print mode where print processing is performed so that the print processing is speeded up although the quality of an image formed by the print processing is degraded as compared with the normal print mode. The image quality priority print mode is a print mode where print processing is performed so that the quality of an image formed by the print processing is improved although the speed of the print processing is slowed down as compared with the normal print mode.

As illustrated in FIG. 1, the ink jet printer 1 includes a control unit 2 that controls each component of the ink jet printer 1, a head unit 3 where discharge portions D that discharge ink to the recording medium PP are provided, and a transport unit 4 for changing a relative position of the recording medium PP with respect to the head unit 3.

The control unit 2 is configured to include one or a plurality of CPUs and a digital-analog conversion circuit. However, the control unit 2 may include various circuits such as FPGAs instead of the CPUs or in addition to the CPUs. Here, CPU is an abbreviation of Central Processing Unit, and FPGA is an abbreviation of field-programmable gate array.

As illustrated in FIG. 1, the control unit 2 generates a drive signal Com that is an analog electrical signal for driving the discharge portions D and supplies the generated drive signal Com to the head unit 3.

The control unit 2 generates a print signal SI for specifying a type of operation of the discharge portions D based on the print data Img and the print setting information Info. Here, the print signal SI is a digital electrical signal that specifies the type of operation of the discharge portions D by specifying whether or not to supply the drive signal Com to the discharge portions D. The control unit 2 converts the print signal SI that is a digital electrical signal into an optical signal H-SI and supplies the optical signal H-SI to the head unit 3. Here, the optical signal H-SI is an optical signal representing information of the same content as that represented by the print signal SI.

The head unit 3 converts the optical signal H-SI into the print signal SI and drives the discharge portions D based on the print signal SI. In this way, the control unit 2 causes the discharge portions D to discharge ink according to the print signal SI generated based on the print data Img, and thereby the control unit 2 can form an image represented by the print data Img on the recording medium PP.

The control unit 2 generates a transport control signal Ctr-K for controlling the transport unit 4 based on the print setting information Info and supplies the generated transport control signal Ctr-K to the transport unit 4.

As illustrated in FIG. 1, the head unit 3 includes a supply circuit 31 and a print head 32.

Among these, the print head 32 includes M discharge portions D. Here, the value M is a natural number satisfying "M≥2". In the following description, an mth discharge portion D of the M discharge portions provided in the print head 32 may be referred to as a discharge portion D[m]. Here, the variable m is a natural number satisfying "1≤m≤M". Further, in the following description, when a component, a signal, or the like of the ink jet printer 1 corresponds to the discharge portion D[m], a suffix [m] may be added to reference letters for representing the component, the signal, or the like.

The supply circuit 31 switches whether or not to supply the drive signal Com to the discharge portion D[m] based on the print signal SI.

1.2. Configuration of Ink Jet Printer

Next, an example of a configuration of the ink jet printer 1 according to the present embodiment will be described with reference to FIGS. 2 to 4.

Figure 2:
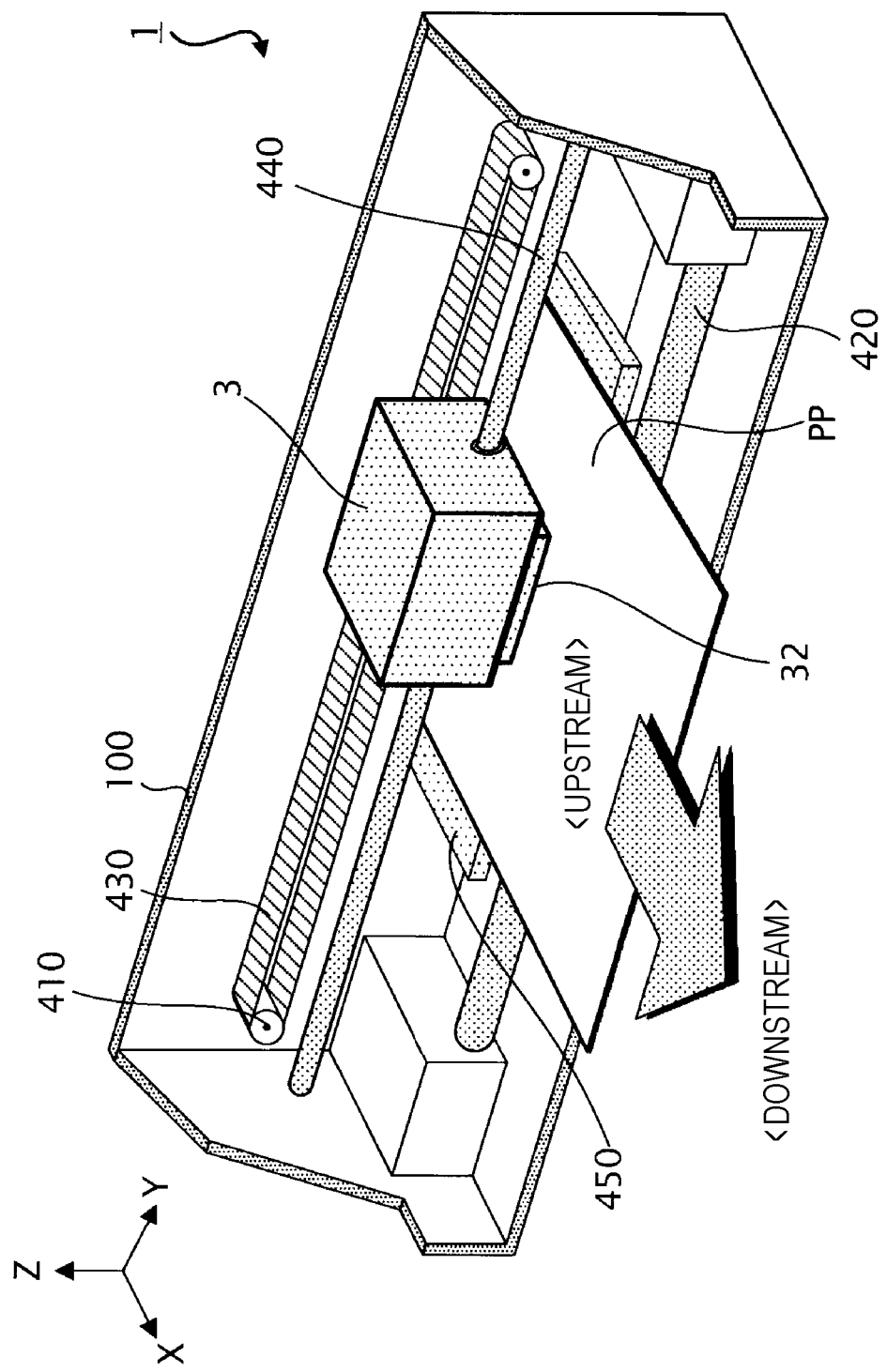
FIG. 2 is a perspective view showing an example of a rough inside structure of the ink jet printer.

FIG. 2 is a perspective view showing an example of a rough inside structure of the ink jet printer 1.

As shown in FIG. 2, in the present embodiment, a case is assumed where the ink jet printer 1 is a serial printer. Specifically, when performing print processing, the ink jet printer 1 forms dots according to the print data Img on the recording medium PP by discharging ink from the discharge portions D while transporting the recording medium PP in a sub-scanning direction and reciprocating the head unit 3 in a main scanning direction crossing the sub-scanning direction.

In the following description, a +X direction and a −X direction opposite to the +X direction are collectively referred to as an "X axis direction", a +Y direction crossing the X axis direction and a −Y direction opposite to the +Y direction are collectively referred to as a "Y axis direction", and a +Z direction crossing the X axis direction and the Y axis direction and a −Z direction opposite to the +Z direction are collectively referred to as a "Z axis direction". In the present embodiment, as illustrated in FIG. 2, a direction from the −X side that is upstream to the +X side that is downstream is defined as the sub-scanning direction, and the +Y direction and the −Y direction are defined as the main scanning direction.

As illustrated in FIG. 2, the ink jet printer 1 according to the present embodiment includes a housing 100. The control unit 2, the head unit 3, and the transport unit 4 described above are provided inside the housing 100.

Among these, the transport unit 4 includes, as illustrated in FIG. 2, a carriage transport mechanism 410 for reciprocating the head unit 3, a timing belt 430 that is fixed to the head unit 3 and is driven by the carriage transport mechanism 410, and a carriage guide shaft 440 that reciprocatably supports the head unit 3 in the Y axis direction. Therefore, the transport unit 4 can reciprocate the head unit 3 in the Y axis direction along the carriage guide shaft 440.

As illustrated in FIG. 2, the transport unit 4 includes a platen 450 provided on the −Z side of the head unit 3 and a medium transport mechanism 420 for transporting the recording medium PP on the platen 450 to the +X side. Therefore, when the print processing is performed, the transport unit 4 changes the relative position of the recording medium PP with respect to the head unit 3 by reciprocating the head unit 3 in the Y axis direction and transporting the recording medium PP in the +X direction, so that ink can be landed on the entire recording medium PP.

Although not shown in the drawings, in the present embodiment, the ink jet printer 1 includes four ink cartridges provided respectively to four color inks of black, cyan, magenta, and yellow. Each ink cartridge stores ink of color corresponding to the ink cartridge.

Here, an overview of operation of the control unit 2 when the print processing is performed will be described.

When the print processing is performed, the control unit 2 generates a signal for controlling the head unit 3 such as the print signal SI and a signal for controlling the transport unit 4 such as the transport control signal Ctr-K based on various data such an the print data Img supplied from the host computer. The control unit 2 controls the head unit 3 so that the discharge portions D are driven while controlling the carriage transport mechanism 410 and the medium transport mechanism 420 included in the transport unit 4 so as to change the relative position of the recording medium PP with respect to the head unit 3 based on various signals such as the print signal SI and the transport control signal Ctr-K. Thereby, the control unit 2 adjusts the presence or absence of discharge of ink from the discharge portions D, an ink discharge amount, an ink discharge timing, and the like and controls each component of the ink jet printer 1 so that an image corresponding to the print data Img is formed on the recording medium PP.

Figure 3:
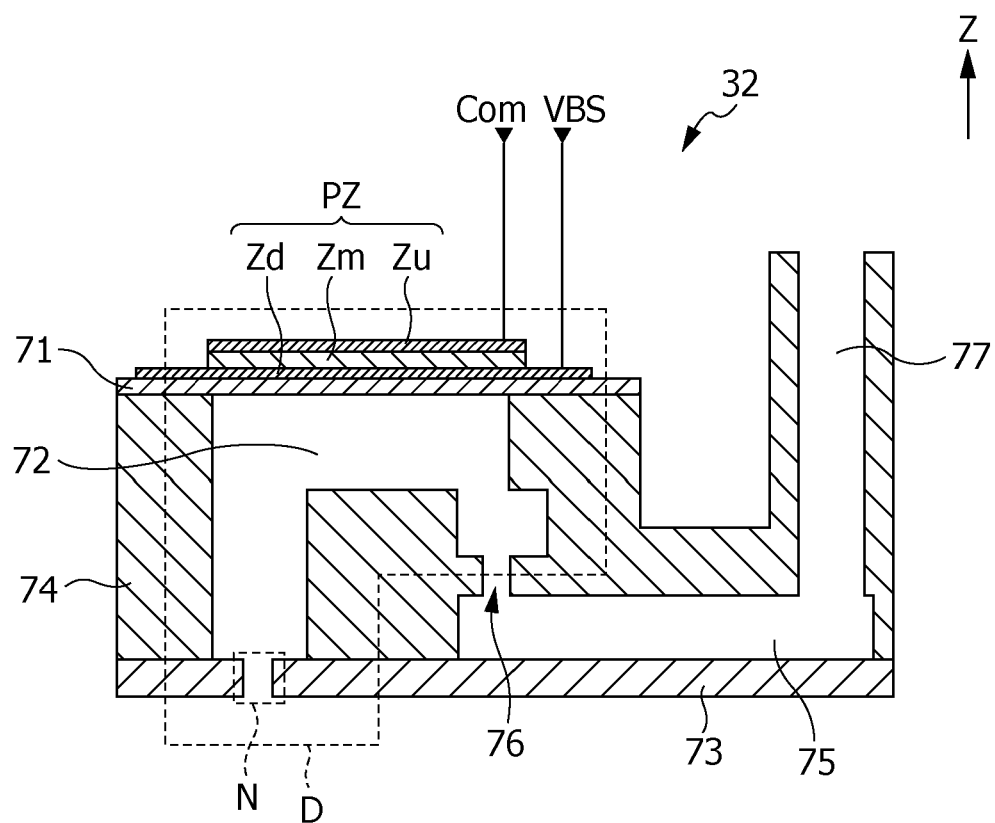
FIG. 3 is an explanatory diagram for explaining an example of a structure of a discharge portion.

FIG. 3 is a schematic partial cross-sectional view of the print head 32 obtained by cutting the print head 32 so as to include the discharge portion D.

As shown in FIG. 3, the discharge portion D includes a piezoelectric element PZ, a cavity 72 the inside of which is filled with ink, a nozzle N communicating with the cavity 72, and a vibration plate 71. The discharge portion D discharges ink in the cavity from the nozzle N when the piezoelectric element PZ is driven by the drive signal Com. The cavity 72 is a space partitioned by a cavity plate 74, a nozzle plate 73 where the nozzle N is formed, and the vibration plate 71. The cavity 72 communicates with a reservoir 75 through an ink supply port 76. The reservoir 75 communicates with an ink cartridge corresponding to the discharge portion D among the four ink cartridges through an ink intake port 77. The piezoelectric element PZ has an upper electrode Zu, a lower electrode Zd, and a piezoelectric body Zm provided between the upper electrode Zu and the lower electrode Zd. The lower electrode Zd is set to a reference potential VBS. When the drive signal Com is supplied to the upper electrode Zu and a voltage is applied between the upper electrode Zu and the lower electrode Zd, the piezoelectric element PZ is displaced in the +Z direction or the −Z direction according to the applied voltage. As a result, the piezoelectric element PZ vibrates. The lower electrode Zd is bonded to the vibration plate 71. Therefore, when the piezoelectric element PZ vibrates by being driven by the drive signal Com, the vibration plate 71 also vibrates. Then, the volume of the cavity 72 and the pressure in the cavity 72 are changed by the vibration of the vibration plate 71, and the ink filled in the cavity 72 is discharged from the nozzle N. When the ink in the cavity 72 is discharged and the ink in the cavity 72 is reduced, the discharge portion D receives supply of ink from an ink cartridge corresponding to the discharge portion D.

Figure 4:
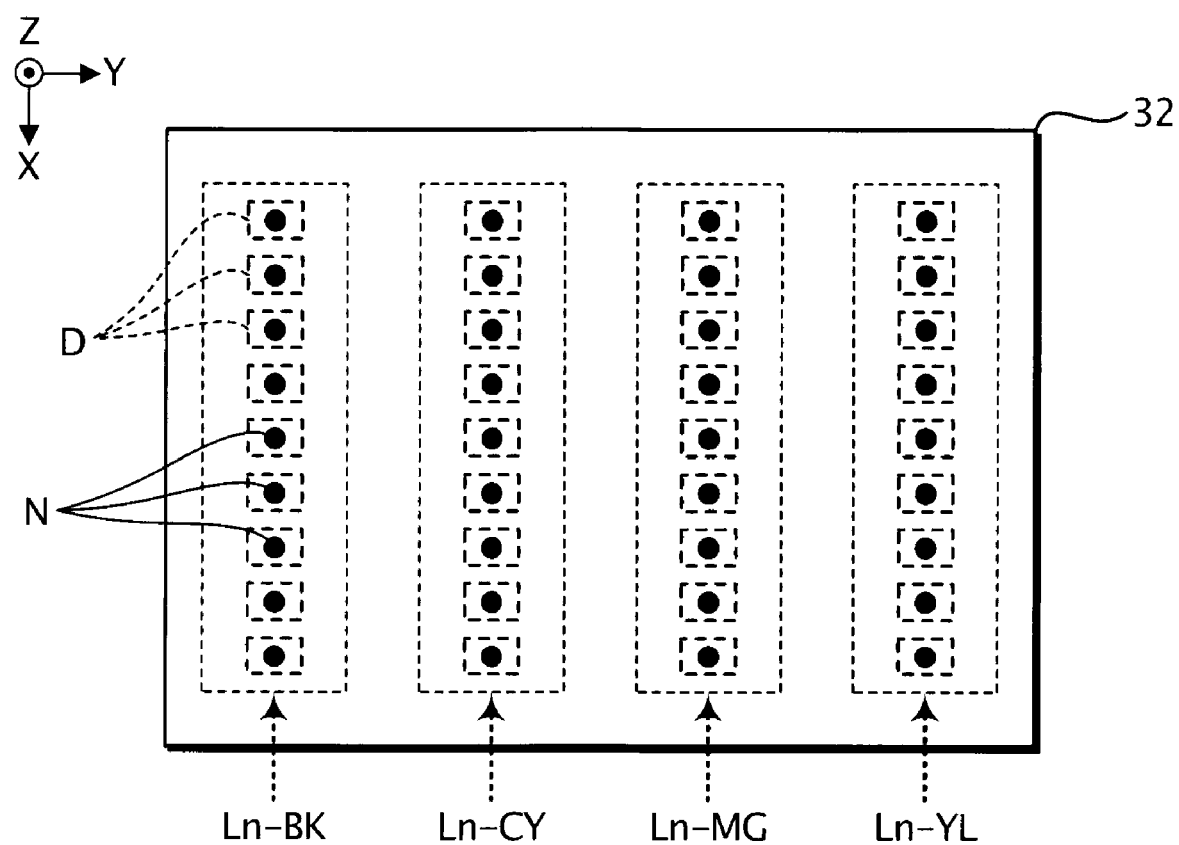
FIG. 4 is a cross-sectional view showing an example of a print head.

FIG. 4 is a diagram showing an example of overview of a planar configuration of the print head 32 when the print head 32 is viewed from the +Z direction.

As shown in FIG. 4, the print head 32 is provided with four nozzle rows Ln including a nozzle row Ln-BK that is a plurality of nozzles N extending in a predetermined direction, a nozzle row Ln-CY that is a plurality of nozzles N extending in a predetermined direction, a nozzle row Ln-MG that is a plurality of nozzles N extending in a predetermined direction, and a nozzle row Ln-YL that is a plurality of nozzles N extending in a predetermined direction. Here, each of the plurality of nozzles N belonging to the nozzle row Ln-BK is a nozzle N provided to the discharge portion D that discharges black ink, each of the plurality of nozzles N belonging to the nozzle row Ln-CY is a nozzle N provided to the discharge portion D that discharges cyan ink, each of the plurality of nozzles N belonging to the nozzle row Ln-MG is a nozzle N provided to the discharge portion D that discharges magenta ink, and each of the plurality of nozzles N belonging to the nozzle row Ln-YL is a nozzle N provided to the discharge portion D that discharges yellow ink. In the present embodiment, as an example, a case is assumed where each nozzle row Ln is composed of a plurality of nozzles N arranged so as to extend in the X axis direction.

1.3. Overview of Substrates and Circuits Included in Ink Jet Printer

Next, an example of overview of various substrates and various circuits provided in the ink jet printer 1 according to the present embodiment will be described with reference to FIG. 5.

Figure 5:
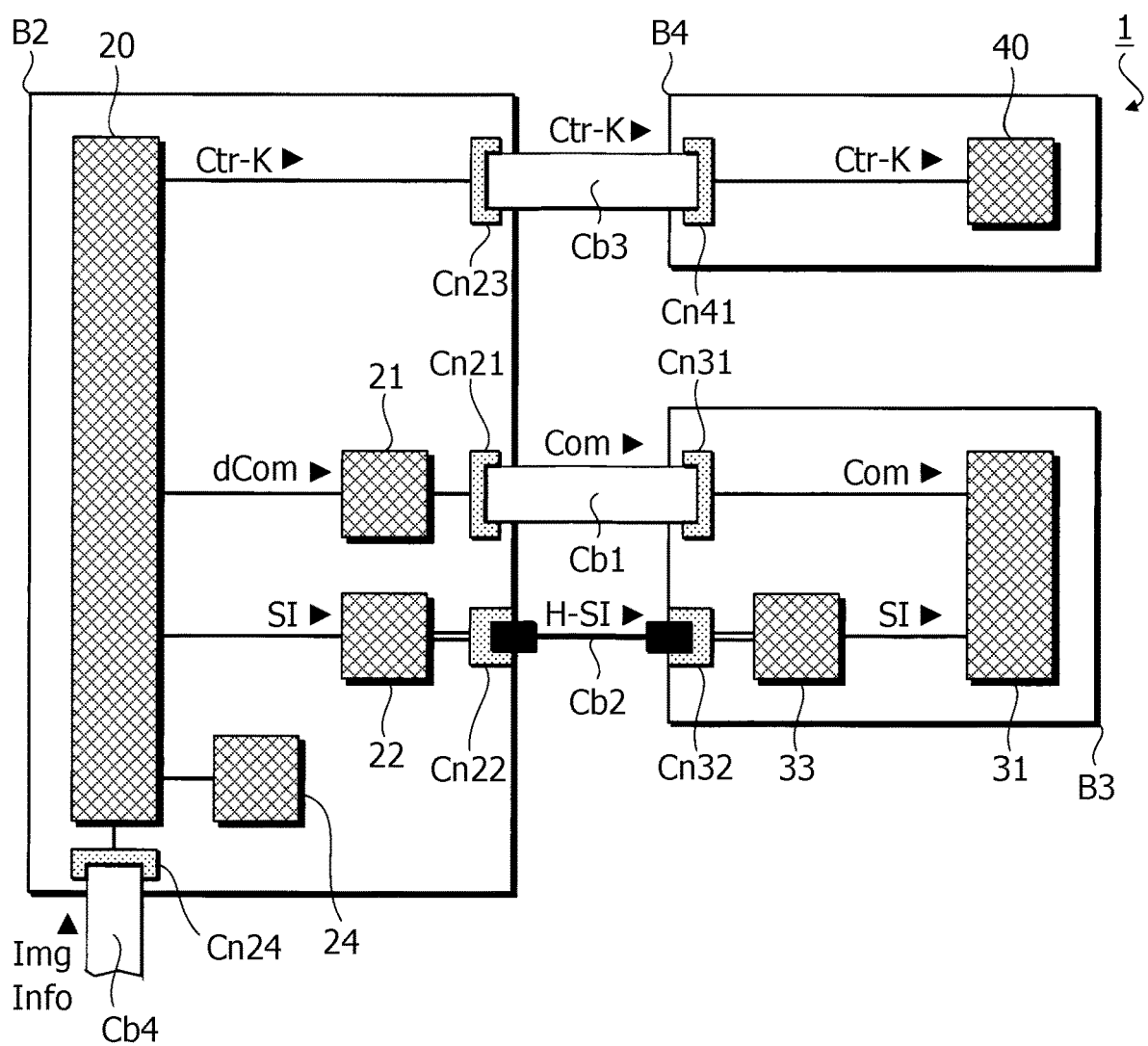
FIG. 5 is an explanatory diagram for explaining an example of a circuit arrangement in the ink jet printer.

FIG. 5 is an explanatory diagram for explaining the example of overview of various substrates and various circuits provided in the ink jet printer 1.

As illustrated in FIG. 5, the control unit 2 includes a substrate B2, a print control circuit 20 provided on the substrate B2, a drive circuit 21, a signal conversion circuit 22, and a storage apparatus 24.

Among these, the print control circuit 20 generates the transport control signal Ctr-K and the print signal SI based on the print data Img and the print setting information Info as described above. Further, the print control circuit 20 generates a waveform definition signal dCom that is a digital signal that defines a waveform of the drive signal Com.

The drive circuit 21 generates the drive signal Com having a waveform defined by the waveform definition signal dCom based on the waveform definition signal dCom. The drive circuit 21 is configured including, for example, a DA conversion circuit.

The signal conversion circuit 22 converts the print signal SI that is an electrical signal into an optical signal H-SI.

The storage apparatus 24 is configured including a non-volatile memory such as, for example, a ROM, an EEPROM, or a PROM. Here, ROM is an abbreviation of Read Only Memory, EEPROM is an abbreviation of Electrically Erasable Programmable Read-Only Memory, and PROM is an abbreviation of Programmable ROM. The storage apparatus 24 stores various information such as a control program of the ink jet printer 1.

As illustrated in FIG. 5, the head unit 3 includes a substrate B3, the supply circuit 31 provided on the substrate B3, and a signal conversion circuit 33.

Among these, the supply circuit 31 switches whether or not to supply the drive signal Com to the discharge portion D[m] based on the print signal SI as described above.

The signal conversion circuit 33 converts the optical signal H-SI into the print signal SI that is an electrical signal.

As illustrated in FIG. 5, the transport unit 4 includes a substrate B4 and a transport drive circuit 40 provided on the substrate B4.

Among these, the transport drive circuit 40 generates a signal for driving the carriage transport mechanism 410 and the medium transport mechanism 420 based on the transport control signal Ctr-K.

As illustrated in FIG. 5, the ink jet printer 1 includes a cable Cb1 that couples a connector Cn21 provided on the substrate B2 with a connector Cn31 provided on the substrate B3, a cable Cb2 that couples a connector Cn22 provided on the substrate B2 with a connector Cn32 provided on the substrate B3, and a cable Cb3 that couples a connector Cn23 provided on the substrate B2 with a connector Cn41 provided on the substrate B4.

Among these, the cable Cb1 is, for example, an electrical cable such as FFC. The cable Cb1 transmits the drive signal Com that is an electrical signal generated by the drive circuit 21 to the supply circuit 31. Here, FFC is an abbreviation of Flexible Flat Cable.

The able Cb2 is, for example, an optical cable. The cable Cb2 transmits the optical signal H-SI generated by the signal conversion circuit 22 to the signal conversion circuit 33.

The cable Cb3 is, for example, an electrical cable such as FFC. The cable Cb3 transmits the transport control signal Ctr-K generated by the print control circuit 20 to the transport drive circuit 40.

The substrate B2 is provided with a connector Cn24 to which a cable Cb4 is coupled. The cable Cb4 is, for example, an electrical cable such as FFC. The cable Cb4 transmits the print data Img and the print setting information Info, which are supplied from the host computer to the ink jet printer 1, to the print control circuit 20.

In recent years, the number of discharge portions D provided in an ink jet printer tends to increase as the resolution of the ink jet printer increases and print processing of the ink jet printer is speeded up. Therefore, in recent years, the amount of data of the print signal SI for controlling the discharge portions D tends to increase. However, when the print signal SI is transmitted through an electrical cable, the possibility that a delay occurs in the transmission of the print signal SI increases as the amount of data of the print signal SI increases. When a delay occurs in the transmission of the print signal SI, the print processing delays, so that there may be a problem that a high resolution image cannot be printed at high speed.

When coping with needs of upsizing of an ink jet printer, a length between the control unit 2 that generates the print signal SI and the head unit 3 to which the print signal SI is supplied may be long. However, when the print signal SI is transmitted through an electrical cable, if the length between the control unit 2 and the head unit 3 is long and a wiring length of the electrical cable that transmits the print signal SI is long, there may be a problem that noise is superimposed on the print signal SI and the quality of an image formed by the print processing performed based on the print signal SI degrades.

On the other hand, in the present embodiment, the print signal SI is transmitted through the cable Cb2 that is an optical cable. In general, the optical cable can quickly transmit large-capacity data and has high resistance against noise as compared with an electrical cable. Therefore, according to the present embodiment, even when the amount of data of the print signal SI increases or a transmission distance of the print signal SI increases, it is possible to form a high quality image in the print processing while preventing delay of the print processing.

1.4. Configuration of Head Unit

Next, an example of a configuration of the head unit 3 according to the present embodiment will be described with reference to FIGS. 6 to 7.

Figure 6:
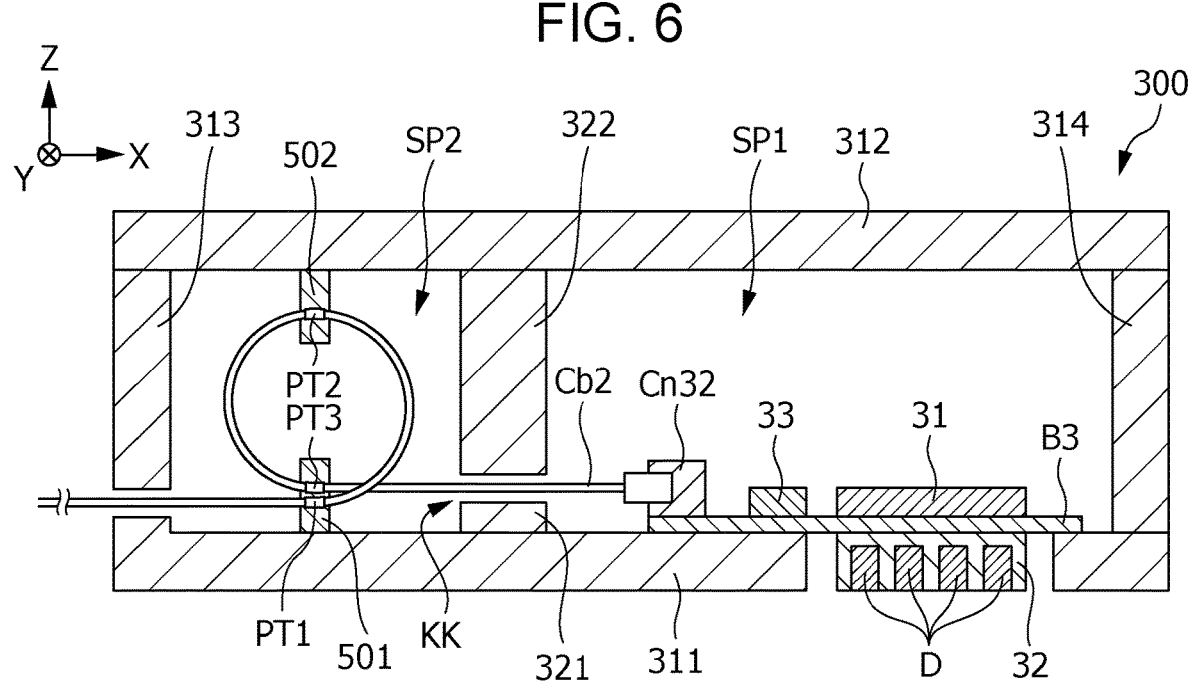
FIG. 6 is a cross-sectional view showing an example of a rough structure of an exterior case.

FIG. 6 is a schematic cross-sectional view of the head unit 3 obtained by cutting the head unit 3 by a plane perpendicular to the Y axis direction.

As shown in FIG. 6, the head unit 3 includes an exterior case 300, the substrate B3 stored in the exterior case 300, and the print head 32 provided so as to be exposed from the exterior case 300 on the −Z side of the exterior case 300. As described above, the substrate B3 is provided with the supply circuit 31, the signal conversion circuit 33, and the connector Cn32 to which the cable Cb2 is coupled.

In the present embodiment, for example, as shown in FIG. 6, the exterior case 300 includes a bottom portion 311, an upper lid portion 312 provided on the +Z side of the bottom portion 311, a side wall portion 313 that forms an end portion in the −X direction of the exterior case 300 between the bottom portion 311 and the upper lid portion 312 in the Z axis direction, and a side wall portion 314 that forms an end portion in the +X direction of the exterior case 300 between the bottom portion 311 and the upper lid portion 312 in the Z axis direction. Inside the exterior case 300, an inner wall portion 321 and an inner wall portion 322 are provided in a position between the bottom portion 311 and the upper lid portion 312 in the Z axis direction and between the side wall portion 313 and the side wall portion 314 in the X axis direction. A space inside the exterior case 300, that is, a space surrounded by the bottom portion 311, the upper lid portion 312, the side wall portion 313, and the side wall portion 314, is divided by the inner wall portion 321 and the inner wall portion 322 into an internal space SP1 which is located on the +X side of the inner wall portion 321 and the inner wall portion 322 and which stores the substrate B3 and an internal space SP2 which is located on the −X side of the inner wall portion 321 and the inner wall portion 322 and which stores the cable Cb2.

In the present embodiment, as shown in FIG. 6, the cable Cb2 extends through the internal space SP2, a through hole KK provided between the inner wall portion 321 and the inner wall portion 322, and the internal space SP1, and couples to the connector Cn32 in the internal space SP1.

In the present embodiment, the cable Cb2 is held by a holding portion 501 and a holding portion 502 so as to be wired in a loop shape in the internal space SP2 when viewed from the Y axis direction. Specifically, in the internal space SP2, the cable Cb2 is wired so that a portion PT1 of the cable Cb2 is held by the holding portion 501, a portion PT2 closer to the connector Cn32 than the portion PT1 on a wiring route of the cable Cb2 is held by the holding portion 502 located on the +Z side of the holding portion 501, and a portion PT3 closer to the connector Cn32 than the portion PT2 on the wiring route of the cable Cb2 is held by the holding portion 501.

In other words, in the present embodiment, the cable Cb2 is wired so that a wiring length between the portion PT1 and the portion PT2 of the cable Cb2 is longer than a linear distance between the portion PT1 and the portion PT2. Further, in the present embodiment, the cable Cb2 is wired so that a wiring length between the portion PT1 and the portion PT3 of the cable Cb2 is longer than a linear distance between the portion PT1 and the portion PT3. In this way, in the present embodiment, the cable Cb2 is wired in a curved shape in the internal space SP2.

Although not shown in the drawings, in the present embodiment, the cable Cb1 is coupled to the connector Cn31 provided on the substrate B3 from the +Z side of the internal space SP1 through the internal space SP1. In other words, in the present embodiment, the cable Cb1 couples the connector Cn31 with the connector Cn21 without through the internal space SP2.

Figure 7:
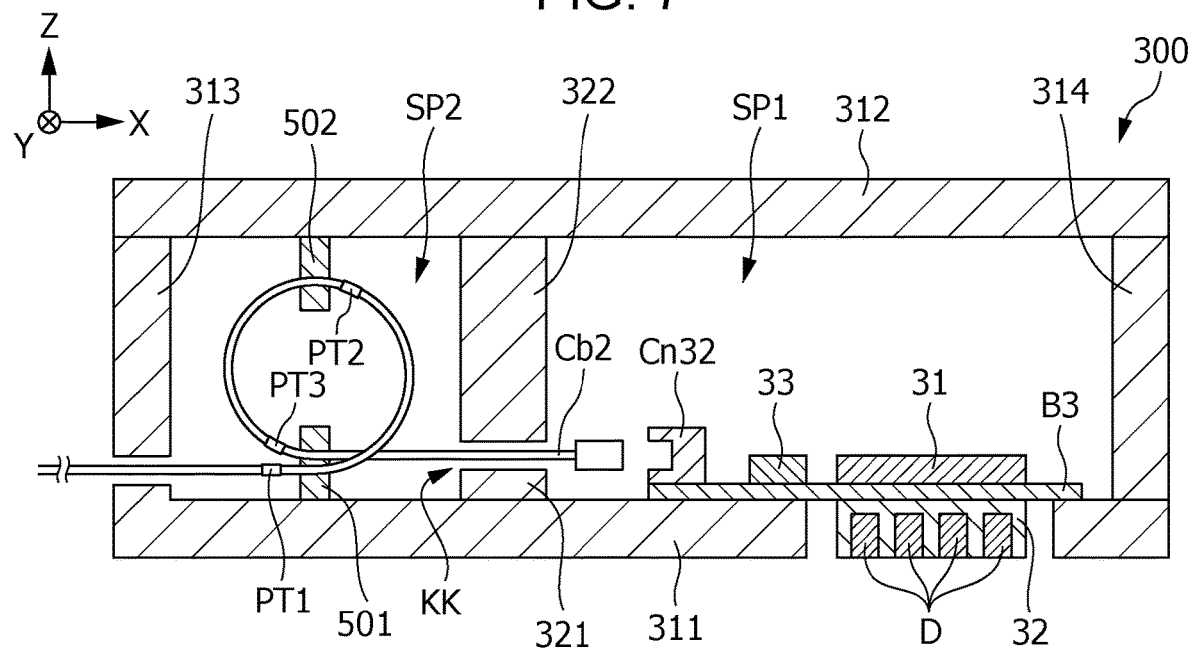
FIG. 7 is an explanatory diagram for explaining an example of behavior of a cable in the exterior case.

FIG. 7 is an explanatory diagram for explaining an example of positional change of the cable Cb2 when the cable Cb2 is removed from the connector Cn32.

As shown in FIG. 7, when the cable Cb2 is removed from the connector Cn32 and an end portion on the +X side of the cable Cb2 is displaced to the −X side of the connector Cn32, as compared with a case where the cable Cb2 is coupled to the connector Cn32, the portion PT3 of the cable Cb2 is displaced to the −X side, the portion PT2 of the cable Cb2 is displaced to the +X side, and the portion PT1 of the cable Cb2 is displaced to the −X side.

In this case, the holding portion 501 and the holding portion 502 may hold the cable Cb2 so that the portion PT1, the portion PT2, and the portion PT3 are smoothly displaced in the X axis direction. In other words, the holding portion 501 and the holding portion 502 may hold the cable Cb2 so that the shape of the cable Cb2 in the internal space SP2 in a case where the cable Cb2 is removed from the connector Cn32 is substantially the same as the shape of the cable Cb2 in the internal space SP2 in a case where the cable Cb2 is coupled to the connector Cn32.

Further, in this case, the holding portion 501 and the holding portion 502 may hold the cable Cb2 so that displacement in the X axis direction of the portion PT1 is limited while the portion PT3 is smoothly displaced in the X axis direction. In other words, the holding portion 501 and the holding portion 502 may hold the cable Cb2 so that the size of the loop formed by the cable Cb2 in the internal space SP2 in the case where the cable Cb2 is removed from the connector Cn32 is larger than the size of the loop formed by the cable Cb2 in the internal space SP2 in the case where the cable Cb2 is coupled to the connector Cn32.

1.5. Comparative Example

Hereinafter, in order to clarify effects of the present embodiment, an exterior case 300Z according to a comparative example will be described with reference to FIGS. 8 to 10.

Figure 8:
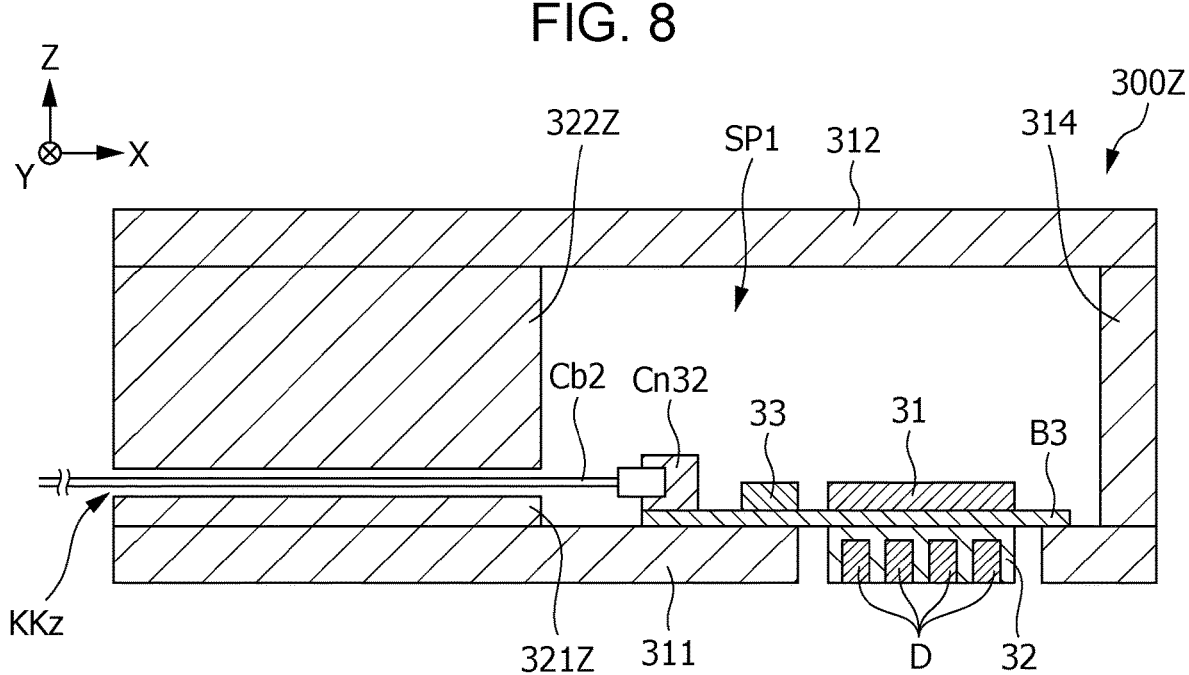
FIG. 8 is a cross-sectional view showing an example of a rough structure of an exterior case according to a comparative example.

FIG. 8 is a schematic cross-sectional view of a head unit according to the comparative example obtained by cutting the head unit according to the comparative example by a plane perpendicular to the Y axis direction.

As shown in FIG. 8, the head unit according to the comparative example has the exterior case 300Z. The exterior case 300Z includes the bottom portion 311, the upper lid portion 312, the side wall portion 314 that forms an end portion in the +X direction of the exterior case 300Z between the bottom portion 311 and the upper lid portion 312 in the Z axis direction, and wall portions 321Z and 322Z that form end portions in the −X direction of the exterior case 300Z between the bottom portion 311 and the upper lid portion 312 in the Z axis direction. The internal space SP1 surrounded by the bottom portion 311, the upper lid portion 312, the wall portion 321Z, and the wall portion 322Z is provided inside the exterior case 300Z. That is, the exterior case 300Z is different from the exterior case 300 according to the embodiment in that the exterior case 300Z does not have the internal space SP2.

In the comparative example, as shown in FIG. 8, the cable Cb2 extends through a through hole KKz provided between the wall portion 321Z and the wall portion 322Z and the internal space SP1, and couples to the connector Cn32 in the internal space SP1. That is, in the comparative example, the cable Cb2 is linearly wired in the through hole KKz.

Figure 9:
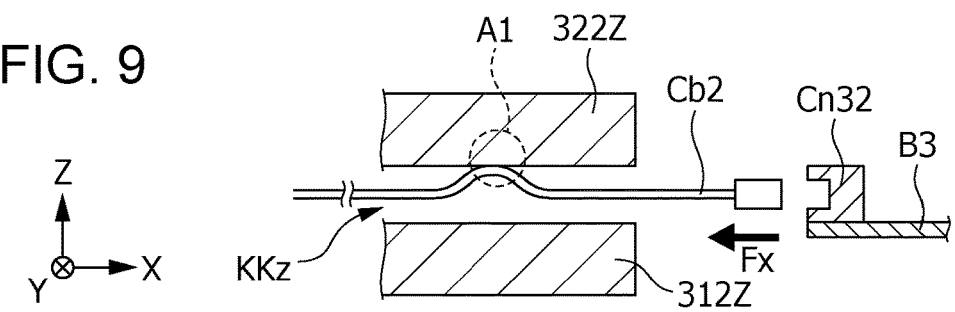
FIG. 9 is an explanatory diagram for explaining an example of behavior of the cable in the exterior case.
Figure 10:
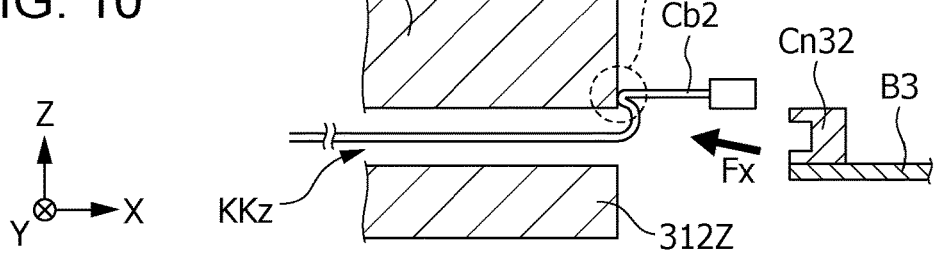
FIG. 10 is an explanatory diagram for explaining an example of behavior of the cable in the exterior case.

FIGS. 9 and 10 are explanatory diagrams for explaining behavior of the cable Cb2 when the cable Cb2 is removed from the connector Cn32 in the comparative example.

As shown in FIGS. 9 and 10, when an operator removes the cable Cb2 from the connector Cn32 by displacing the end portion on the +X side of the cable Cb2 to the −X side of the connector Cn32, the operator has to apply a force Fx having a component toward the −X direction to the cable Cb2.

However, for example, as shown in FIG. 9, the cable Cb2 is arranged linearly in the through hole KKz, so that there is a case where the cable Cb2 is bent by the force Fx in the Z axis direction inside the through hole KKz and a bent portion A1 of the cable Cb2 collides with an inner wall portion 321Z or an inner wall portion 322Z. When the cable Cb2 collides with the inner wall portion 321Z or the inner wall portion 322Z, the bent portion A1 that causes the collision is bent in a radius smaller than an allowable bending radius of the cable Cb2, and as a result, the cable Cb2 may be damaged.

Further, for example, as shown in FIG. 10, when the force Fx is applied to the cable Cb2 and the cable Cb2 is displaced in the −X direction, the cable Cb2 may collide with a wall surface on the +X side of the inner wall portion 321Z or the inner wall portion 322Z. When the cable Cb2 collides with the wall surface on the +X side of the inner wall portion 321Z or the inner wall portion 322Z, a bent portion A2 that causes the collision is bent in a radius smaller than the allowable bending radius of the cable Cb2, and the cable Cb2 may be damaged.

As described above, the cable Cb2 is an optical cable, so that the allowable bending radius of the cable Cb2 is larger than that of an electrical cable, so that the possibility that the cable Cb2 is damaged when the cable Cb2 is bent is high. Therefore, in the comparative example, when the cable Cb2 is removed from the connector Cn32, situations as shown in FIGS. 9 and 10 may occur, so that the cable Cb2 may be damaged.

On the other hand, the exterior case 300 according to the present embodiment includes the internal space SP2 for storing the cable Cb2 in a curved shape and in a movable form. Therefore, according to the present embodiment, when the cable Cb2 is removed from the connector Cn32, the force Fx applied to the cable Cb2 can be released in a direction different from the X axis direction in a curved portion of the cable Cb2 in the internal space SP2. Thereby, according to the present embodiment, it is possible to prevent collision of the cable Cb2 with the inner wall portion 321 or the inner wall portion 322 as shown in FIG. 9 or 10. Further, according to the present embodiment, even when the collision of the cable Cb2 with the inner wall portion 321 or the inner wall portion 322 as shown in FIG. 9 or 10 occurs, it is possible to reduce damage received by the cable Cb2 due to the collision as compared with the comparative example.

1.6. Summary of Embodiment

As described above, the ink jet printer 1 according to the present embodiment is characterized by including the substrate B3 provided with the connector Cn32, the substrate B2 provided with the connector Cn22, the exterior case 300 that stores the substrate B3, and the cable Cb2 that couples the connector Cn32 with the connector Cn22 and transmits the optical signal H-SI, and is characterized in that the exterior case 300 is provided with the internal space SP2 where the cable Cb2 is movably arranged in a curved shape.

That is, according to the present embodiment, when the cable Cb2 is removed from the connector Cn32, a force applied to the cable Cb2 can be released in a direction different from a direction in which the cable Cb2 is removed. Therefore, according to the present embodiment, for example, as compared with the comparative example, it is possible to reduce the possibility that the cable Cb2 collides with the exterior case 300 or it is possible to reduce damage on the cable Cb2 even if the cable Cb2 collides with the exterior case 300.

In the present embodiment, the substrate B3 is an example of a "first substrate", the substrate B2 is an example of a "second substrate", the connector Cn32 is an example of a "first connector", the connector Cn22 is an example of a "second connector", the exterior case 300 is an example of a "storage body", the cable Cb2 is an example of an "optical cable", and the internal space SP2 is an example of a "storage space".

In the present embodiment, it is characterized that the holding portion 501 that holds the cable Cb2 is provided in the internal space SP2, and the cable Cb2 is arranged so that when the portion PT1 of the cable Cb2 is held by the holding portion 501 and the portion PT3 of the cable Cb2 is held by the holding portion 501, a wiring length of the cable Cb2 from the portion PT1 to the portion PT3 is longer than a linear distance between the portion PT1 and the portion PT3.

That is, according to the present embodiment, the cable Cb2 is arranged in a curved shape in the internal space SP2, so that when the cable Cb2 is removed from the connector Cn32, a force applied to the cable Cb2 can be released in a direction different from a direction in which the cable Cb2 is removed.

In the present embodiment, the holding portion 501 is an example of a "first holding portion", the portion PT1 is an example of a "first portion", and the portion PT3 is an example of a "second portion".

Further, in the present embodiment, it is characterized that the holding portion 501 and the holding portion 502 that hold the cable Cb2 is provided in the internal space SP2, and the cable Cb2 is arranged so that when the portion PT1 of the cable Cb2 is held by the holding portion 501 and the portion PT2 of the cable Cb2 is held by the holding portion 502, a wiring length of the cable Cb2 from the portion PT1 to the portion PT2 is longer than a linear distance between the portion PT1 and the portion PT2.

That is, according to the present embodiment, the cable Cb2 is arranged in a curved shape in the internal space SP2, so that when the cable Cb2 is removed from the connector Cn32, a force applied to the cable Cb2 can be released in a direction different from a direction in which the cable Cb2 is removed.

In the present embodiment, the holding portion 502 is an example of a "second holding portion" and the portion PT2 is another example of the "second portion".

In the present embodiment, a wiring length of the cable Cb2 from the portion PT1 of the cable Cb2 located in the internal space SP2 to the connector Cn32 may be shorter than a wiring length of the cable Cb2 from the portion PT1 to the connector Cn22.

That is, according to the present embodiment, the internal space SP2 for arranging the cable Cb2 in a curved shape is provided close to the connector Cn32, so that when the cable Cb2 is removed from the connector Cn32, a force applied to the cable Cb2 can be released in a direction different from a direction in which the cable Cb2 is removed.

In the present embodiment, the portion PT1 is an example of a "specific portion".

The ink jet printer 1 according to the present embodiment is characterized by including the transport unit 4 that transports the recording medium PP and the print head 32 that discharges ink to the recording medium PP transported by the transport unit 4 and is characterized in that the print head is stored in the exterior case 300.

That is, according to the present embodiment, the cable Cb2 that is an optical cable is coupled to the substrate B3 provided in the exterior case 300 where the print head 32 is stored, so that even when a high-definition image is printed by the print head 32, data corresponding to the image can be transmitted to the print head 32 without delay.

In the present embodiment, the recording medium PP is an example of a "medium", the ink is an example of "liquid", the transport unit 4 is an example of a "transport module", and the print head 32 is an example of a "print module".

In the present embodiment, the substrate B2 is characterized by including the print control circuit 20 that generates the print signal SI specifying discharge of ink from the print head 32, the substrate B3 is characterized by including the supply circuit 31 that switches whether or not to discharge ink from the print head 32 based on the print signal SI, and the print control circuit 20 is characterized by supplying the print signal SI to the supply circuit 31 through the cable Cb2.

That is, according to the present embodiment, even when a high-definition image is printed by the print head 32, data corresponding to the image can be transmitted to the print head 32 without delay.

In the present embodiment, information represented by the print signal SI is an example of "print information", the print control circuit 20 is an example of a "control circuit", and the supply circuit 31 is an example of a "switching circuit".

In the present embodiment, it is characterized by including the cable Cb1 that couples the connector Cn31 provided on the substrate B3 with the connector Cn21 provided on the substrate B2 and transmits the drive signal Com, and it is characterized in that the cable Cb1 is provided in a space different from the internal space SP2.

That is, according to the present embodiment, the cable Cb1 is provided in a space different from the internal space SP2 where the cable Cb2 is provided. Therefore, according to the present embodiment, it is possible to prevent trouble such as entanglement of the cable Cb1 and the cable Cb2 in the internal space SP2 where the cable Cb2 is arranged in a curved shape.

In the present embodiment, the connector Cn31 is an example of a "third connector", the connector Cn21 is an example of a "fourth connector", the drive signal Com is an example of an "electrical signal", and the cable Cb1 is an example of an "electrical cable".

The ink jet printer 1 according to the present embodiment is characterized by including the substrate B3 provided with the connector Cn32, the substrate B2 provided with the connector Cn22, and the cable Cb2 that couples the connector Cn32 with the connector Cn22 and transmits the optical signal H-SI, and is characterized in that when the portion PT1 of the cable Cb2 is held by the holding portion 501 and the portion PT3 of the cable Cb2 is held by the holding portion 501, a wiring length of the cable Cb2 from the portion PT1 to the portion PT3 is longer than a linear distance between the portion PT1 and the portion PT3.

That is, according to the present embodiment, the cable Cb2 is arranged in a curved shape in the internal space SP2, so that when the cable Cb2 is removed from the connector Cn32, a force applied to the cable Cb2 can be released in a direction different from a direction in which the cable Cb2 is removed.

2. MODIFIED EXAMPLES

The present embodiment can be variously modified. Specific modification aspects will be illustrated below. Two or more aspects selected from the illustrations below can be appropriately combined to the extent that they do not contradict each other. In the modified examples illustrated below, regarding elements whose operations and functions are the same as those of the embodiment, a detailed description of each element will be appropriately omitted while using reference letters referred to in the above description.

Modified Example 1

In the embodiment described above, the cable Cb2 is held by two holding portions, which are the holding portion 501 and the holding portion 502, in the internal space SP2. However, the present disclosure is not limited to such an aspect. The cable Cb2 may be held by one or more holding portions in the internal space SP2.

Figure 11:
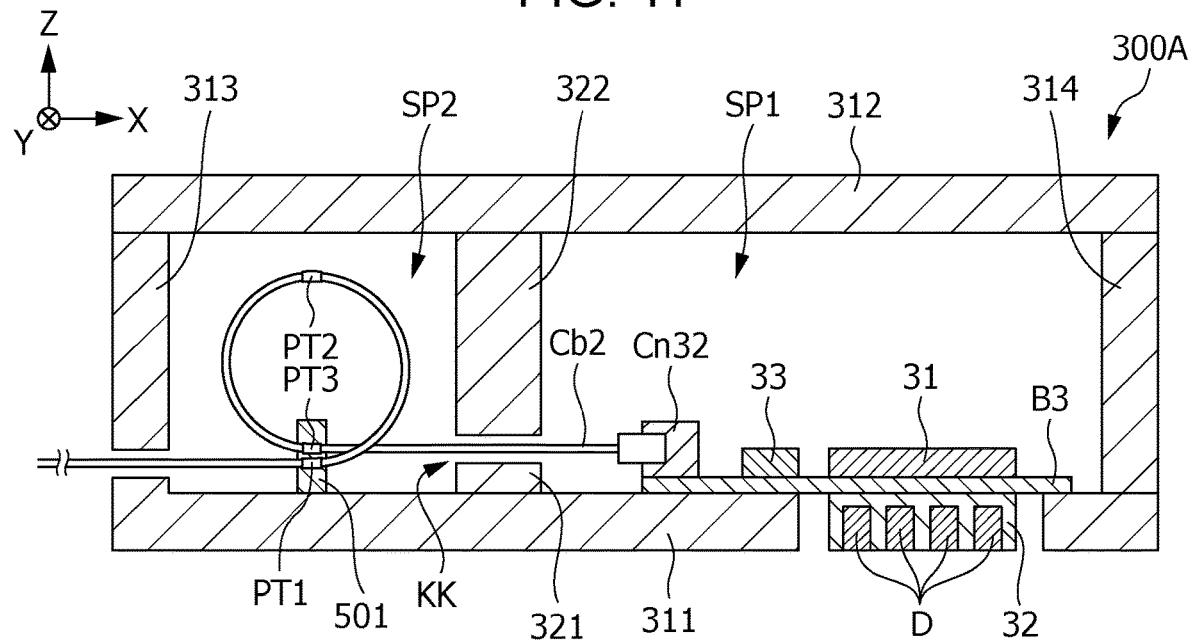
FIG. 11 is a cross-sectional view showing an example of a rough structure of an exterior case according to a modified example 1.

FIG. 11 is a schematic cross-sectional view of an exterior case 300A according to the present modified example. The ink jet printer according to the present modified example is configured in the same manner as the ink jet printer 1 according to the embodiment except that the ink jet printer includes the exterior case 300A instead of the exterior case 300.

As shown in FIG. 11, the exterior case 300A is configured in the same manner as the exterior case 300 according to the embodiment except that the exterior case 300A does not include the holding portion 502.

In the present modified example, as shown in FIG. 11, the cable Cb2 is held by the holding portion 501 so as to be wired in a loop shape in the internal space SP2 when viewed from the Y axis direction. Specifically, in the internal space SP2, the cable Cb2 is wired so that the portion PT1 is held by the holding portion 501 and the portion PT3 is held by the holding portion 501. In other words, in the present modified example, the cable Cb2 is wired so that a wiring length between the portion PT1 and the portion PT3 of the cable Cb2 is longer than a linear distance between the portion PT1 and the portion PT3. In this way, in the present modified example, the cable Cb2 is wired in a curved shape in the internal space SP2.

Figure 12:
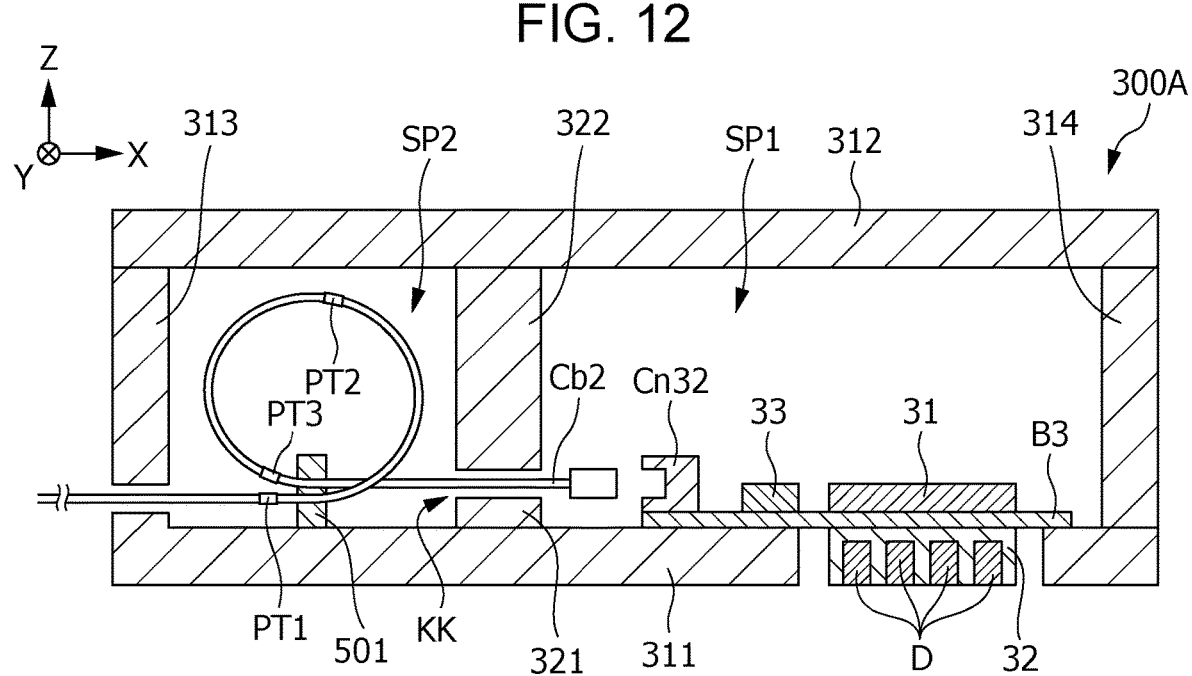
FIG. 12 is an explanatory diagram for explaining an example of behavior of the cable in the exterior case.

FIG. 12 is an explanatory diagram for explaining an example of positional change of the cable Cb2 when the cable Cb2 is removed from the connector Cn32 in the exterior case 300A.

As shown in FIG. 12, when the cable Cb2 is removed from the connector Cn32, as compared with a case where the cable Cb2 is coupled to the connector Cn32, the portion PT3 of the cable Cb2 is displaced to the −X side, the portion PT2 of the cable Cb2 is displaced to one or both of the +X side and the +Z side, and the portion PT1 of the cable Cb2 is displaced to the −X side.

In the present modified example, the holding portion 501 may hold the cable Cb2 so that the portion PT1 and the portion PT3 are smoothly displaced in the X axis direction. Further, in the present modified example, the holding portion 501 may hold the cable Cb2 so that displacement in the X axis direction of the portion PT1 is limited while the portion PT3 is smoothly displaced in the X axis direction.

In this way, the exterior case 300A according to the present modified example includes the internal space SP2 for storing the cable Cb2 in a curved shape and in a movable form. Therefore, according to the present modified example, when the cable Cb2 is removed from the connector Cn32, a force in the X axis direction applied to the cable Cb2 can be released in a direction different from the X axis direction in a curved portion of the cable Cb2 in the internal space SP2. Thereby, according to the present modified example, as compared with the comparative example, it is possible to reduce the possibility that the cable Cb2 collides with the inner wall portion 321 or the inner wall portion 322. Even if the collision of the cable Cb2 with the inner wall portion 321 or the inner wall portion 322 occurs, it is possible to reduce damage received by the cable Cb2 due to the collision as compared with the comparative example.

Modified Example 2

In the embodiment and the modified example described above, the cable Cb2 is wired in a curved shape in the internal space SP2. However, the present disclosure is not limited to such an aspect. The cable Cb2 may be wired in a curved shape and in a movable form in the internal space SP2.

Figure 13:
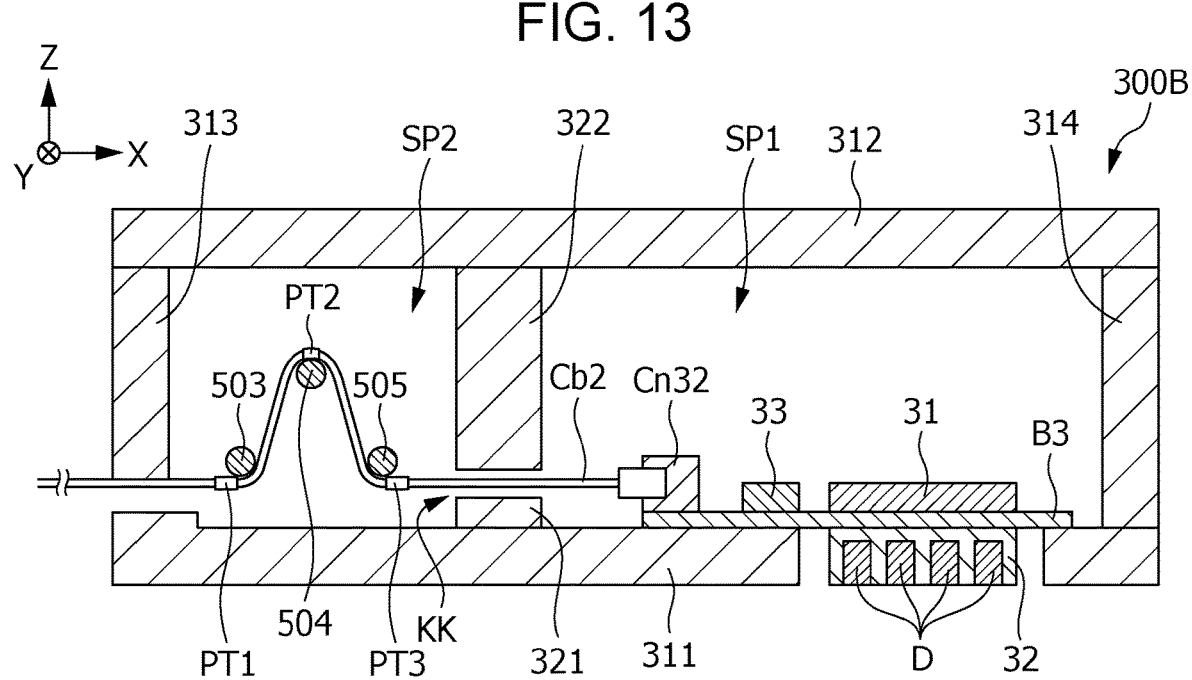
FIG. 13 is a cross-sectional view showing an example of a rough structure of an exterior case according to a modified example 2.

FIG. 13 is a schematic cross-sectional view of an exterior case 300B according to the present modified example. The ink jet printer according to the present modified example is configured in the same manner as the ink jet printer 1 according to the embodiment except that the ink jet printer includes the exterior case 300B instead of the exterior case 300.

As shown in FIG. 13, the exterior case 300B is configured in the same manner as the exterior case 300 according to the embodiment except that the exterior case 300B includes a support portion 503, a support portion 504, and a support portion 505 instead of the holding portion 501 and the holding portion 502.

In the present modified example, as shown in FIG. 13, the cable Cb2 is supported by the support portion 503, the support portion 504, and the support portion 505 so that the cable Cb2 is wired in a curved shape and in a convex shape in the Z axis direction in the internal space SP2 when viewed from the Y axis direction. Specifically, regarding the cable Cb2, in the internal space SP2, the portion PT1 is supported by the support portion 503 from the +Z side of the portion PT1, the portion PT2 is supported by the support portion 504 from the −Z side of the portion PT2, and the portion PT3 is supported by the support portion 505 from the +Z side of the portion PT3. That is, in the present modified example, the cable Cb2 is wired so that a wiring length between the portion PT1 and the portion PT3 of the cable Cb2 is longer than a linear distance between the portion PT1 and the portion PT3. In other words, in the present modified example, the cable Cb2 is wired in a curved shape in the internal space SP2.

Figure 14:
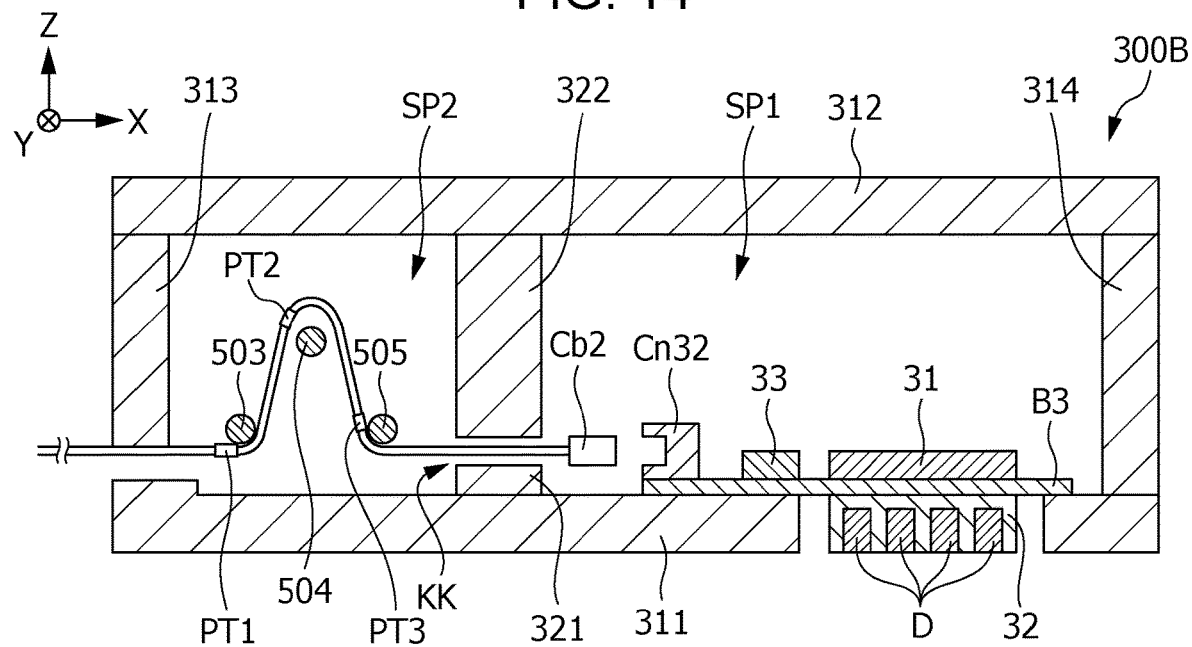
FIG. 14 is an explanatory diagram for explaining an example of behavior of the cable in the exterior case.

FIG. 14 is an explanatory diagram for explaining an example of positional change of the cable Cb2 when the cable Cb2 is removed from the connector Cn32 in the exterior case 300B.

As shown in FIG. 14, when the cable Cb2 is removed from the connector Cn32, as compared with a case where the cable Cb2 is coupled to the connector Cn32, the portion PT3 of the cable Cb2 is displaced to one or both of the −X side and the +Z side, and the portion PT2 of the cable Cb2 is displaced to one or both of the −X side and the +Z side.

In this way, the exterior case 300B according to the present modified example includes the internal space SP2 for storing the cable Cb2 in a curved shape and in a movable form. Therefore, according to the present modified example, when the cable Cb2 is removed from the connector Cn32, a force in the X axis direction applied to the cable Cb2 can be released in a direction different from the X axis direction in a curved portion of the cable Cb2 in the internal space SP2. Thereby, according to the present modified example, as compared with the comparative example, it is possible to reduce the possibility that the cable Cb2 collides with the inner wall portion 321 or the inner wall portion 322. Even if the collision of the cable Cb2 with the inner wall portion 321 or the inner wall portion 322 occurs, it is possible to reduce damage received by the cable Cb2 due to the collision as compared with the comparative example.

Modified Example 3

In the embodiment and the modified examples described above, the print control circuit 20 that generates the print signal SI is provided on the substrate B2. However, the present disclosure is not limited to such an aspect. The print control circuit 20 that generates the print signal SI may be provided on the substrate B3.

Figure 15:
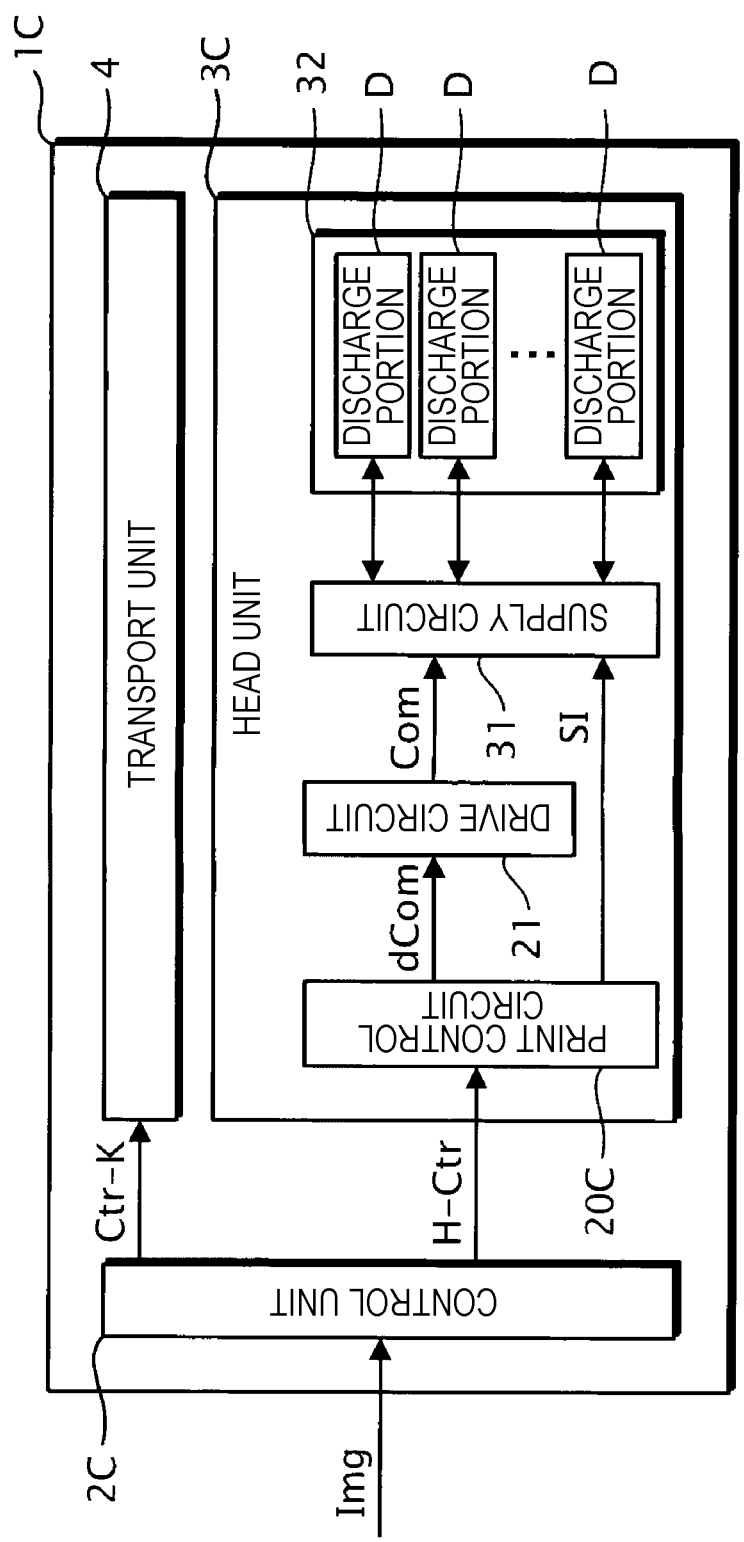
FIG. 15 is a block diagram showing an example of a configuration of an ink jet printer according to a modified example 3.
Figure 16:
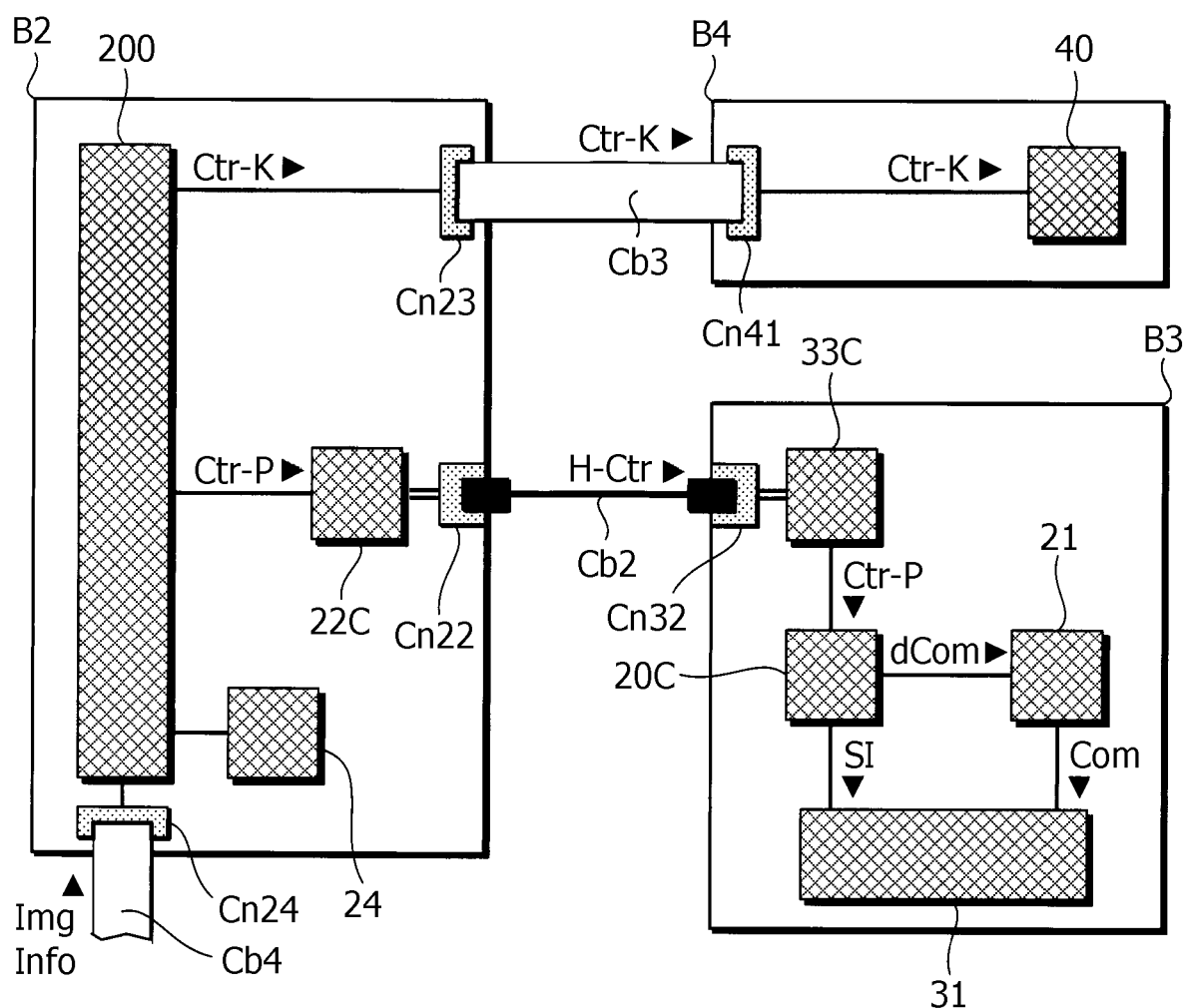
FIG. 16 is an explanatory diagram for explaining an example of a circuit arrangement in the ink jet printer.

FIG. 15 is a functional block diagram showing an example of a configuration of an ink jet printer 1C according to the present modified example. FIG. 16 is an explanatory diagram for explaining an example of overview of various substrates and various circuits provided in the ink jet printer 1C.

As shown in FIG. 15, the ink jet printer 1C is configured in the same manner as the ink jet printer 1 according to the embodiment except that the ink jet printer 1C includes a control unit 2C instead of the control unit 2 and includes a head unit 3C instead of the head unit 3.

As shown in FIG. 16, the control unit 2C is configured in the same manner as the control unit 2 according to the embodiment except that a processing circuit 200 is provided instead of the print control circuit 20, a signal conversion circuit 22C is provided instead of the signal conversion circuit 22, and the drive circuit 21 and the connector Cn21 are not provided on the substrate B2.

Among these, the processing circuit 200 generates a transport control signal Ctr-K and a print control signal Ctr-P based on the print data Img and the print setting information Info. Here, the print control signal Ctr-P is, for example, a signal including the print data Img and the print setting information Info.

The signal conversion circuit 22C converts the print control signal Ctr-P into an optical signal H-Ctr. Here, the optical signal H-Ctr is an optical signal representing information of the same content as that of the information represented by the print control signal Ctr-P.

As shown in FIG. 16, the head unit 3C is configured in the same manner as the head unit 3 according to the embodiment except that, on the substrate B3, a print control circuit 20C is provided, the drive circuit 21 is provided, a signal conversion circuit 33C is provided instead of the signal conversion circuit 33, and the connector Cn31 is not provided.

Among these, the signal conversion circuit 33C converts the optical signal H-Ctr supplied from the signal conversion circuit 22C into the print control signal Ctr-P.

The print control circuit 20C generates the print signal SI and the waveform definition signal dCom based on the print control signal Ctr-P.

In the present modified example, the cable Cb2 that couples the connector Cn22 provided on the substrate B2 with the connector Cn32 provided on the substrate B3 is an optical cable that transmits the optical signal H-Ctr generated by the signal conversion circuit 22C.

As described above, in the present modified example, the cable Cb2 that transmits the optical signal H-Ctr converted from the print control signal Ctr-P is an optical cable. Therefore, even when the amount of data of the print control signal Ctr-P increases or a transmission distance of the print control signal Ctr-P increases, it is possible to form a high quality image in the print processing while preventing delay of the print processing.

Modified Example 4

In the embodiment and the modified examples described above, a case is assumed where the ink jet printer is a serial printer. However, the present disclosure is not limited to such an aspect. The ink jet printer may be a so-called line printer where a plurality of nozzles N are provided to extend wider than the width of the recording medium PP in the print head 32.

Modified Example 5

In the embodiment and the modified examples described above, the ink jet printer discharges ink from the nozzle N by causing the piezoelectric element PZ to vibrate. However, the present disclosure is not limited to such an aspect. For example, a so-called thermal method may be employed where bubbles are generated in the cavity 72 by causing a heating element provided in the cavity 72 to generate heat and the pressure in the cavity 72 is increased, and thereby the ink is discharged.

What is claimed is:

1. A printing apparels comprising:
a head unit having an external case and a first substrate on which a first circuit and a discharge device are disposed, the first circuit being configured to control the discharge device to discharge fluid or to a medium, the first substrate having a first connector electrically connected to the first circuit the external case housing the first substrate, the first circuit, the discharge device and the first connector;
a carriage guide through which the head unit moves along a width of the medium and over the medium,
a control unit having a second substrate on which a second circuit is disposed, the control unit being separately provided from the head unit, the second circuit being configured to the first circuit and the discharge device, the second substrate having a second connector electrically connected to the second circuit; and
an optical cable that couples the first connector with the second connector and transmits an optical signal from the second circuit to the first circuit, wherein
the external case of the head unit is provided with a storage space where the optical cable is arranged movable in an upstanding-curved shape.

2. The printing apparatus according to claim 1, wherein
the external case of the head unit is provided with a first holding portion of the optical cable in the storage space,
when the optical cable is arranged in the upstanding-curved shape in the storage space, a first portion of the optical cable is held by the first holding portion and a second portion of the optical cable is held by the first holding portion, and
when the optical cable is arranged in the upstanding-curved shoe in the storage space, a wiring length of the optical cable from the first portion to the second portion is longer than a linear distance between the first portion and the second portion.

3. The printing apparatus according to claim 1, wherein
the external ease of the head unit is provided with a first holding portion and a second holding portion that hold the optical cable in the storage space,
when the optical cable is arranged in the upstanding-curved shape in the storage space, a first portion of the optical cable is held by the first holding portion and a second portion of the optical cable is held by the second holding portion, and
when the optical cable is arranged in the upstanding-curved shape in the storage space, a wiring length of the optical cable from the first portion to the second portion is longer than a linear distance between the first portion and the second portion.

4. The printing apparatus according to claim 1, wherein a wiring length of the optical cable from a specific portion of the optical cable located in the storage space to the first connector is shorter than a wiring length of the optical cable from the specific portion to the second connector.

5. The printing apparatus according to claim 1, further comprising:
a transport module that transports the medium.

6. The printing apparatus according to claim 5, wherein the second circuit on the second substrate generates print information specifying discharge of the liquid from the discharge device,
the first circuit on the first substrate switches whether or not to discharge the liquid onto the medium from the discharge device based on the print information, and
the second circuit supplies the print information to the first circuit through the optical cable.

7. The printing apparatus according to claim 1, further comprising:
an electrical cable that couples a third connector provided on the first substrate with a fourth connector provided on the second substrate and transmits an electrical signal, wherein
the electrical cable is provided in a space different from the storage space.

* * * * *